United States Patent [19]
Baker et al.

[11] Patent Number: 5,755,855
[45] Date of Patent: May 26, 1998

[54] SEPARATION PROCESS COMBINING CONDENSATION, MEMBRANE SEPARATION AND FLASH EVAPORATION

[75] Inventors: Richard W. Baker, Palo Alto; Kaaeid A. Lokhandwala, Menlo Park; Douglas Gottschlich, Mountain View; Marc L. Jacobs, Berkeley, all of Calif.

[73] Assignee: Membrane Technology and Research, Inc., Menlo Park, Calif.

[21] Appl. No.: 780,868

[22] Filed: Jan. 24, 1997

[51] Int. Cl.[6] .................................................. B01D 53/22
[52] U.S. Cl. ......................... 95/39; 95/45; 95/47; 95/50; 95/54; 95/55
[58] Field of Search ............................ 95/89, 45, 47, 95/50–55

[56] References Cited

U.S. PATENT DOCUMENTS

| | | | |
|---|---|---|---|
| 4,466,946 | 8/1984 | Goddin, Jr. et al. | 423/228 |
| 4,479,871 | 10/1984 | Pahade et al. | 208/340 |
| 4,548,619 | 10/1985 | Steacy | 55/16 |
| 4,589,896 | 5/1986 | Chen et al. | 95/51 X |
| 4,602,477 | 7/1986 | Lucadamo | 95/51 X |
| 4,639,257 | 1/1987 | Duckett et al. | 95/51 X |
| 4,885,063 | 12/1989 | Andre | 203/73 |
| 4,892,564 | 1/1990 | Cooley | 95/55 |
| 5,082,481 | 1/1992 | Barchas et al. | 95/51 X |
| 5,082,551 | 1/1992 | Reynolds et al. | 208/100 |
| 5,089,033 | 2/1992 | Wijmans | 55/16 |
| 5,199,962 | 4/1993 | Wijmans | 55/16 |
| 5,205,843 | 4/1993 | Kaschemekat et al. | 55/16 |
| 5,224,350 | 7/1993 | Mehra | 62/17 |
| 5,256,295 | 10/1993 | Baker et al. | 210/640 |
| 5,281,255 | 1/1994 | Toy et al. | 95/50 |
| 5,374,300 | 12/1994 | Kaschemekat et al. | 95/39 |
| 5,414,190 | 5/1995 | Förg et al. | 95/50 X |
| 5,452,581 | 9/1995 | Dinh et al. | 62/24 |

FOREIGN PATENT DOCUMENTS

| | | | |
|---|---|---|---|
| 3824400 | 1/1990 | Germany | 95/50 |
| 2174379 | 11/1986 | United Kingdom | 95/51 |

OTHER PUBLICATIONS

R.W. Baker and M. Jacobs, "Improve Monomer Recovery from Polyolefin Resin Degassing," Hydrocarbon Processing, Mar. 1996.

Primary Examiner—Robert Spitzer
Attorney, Agent, or Firm—J. Farrant

[57] ABSTRACT

A process for separating two low-boiling components of a gas-phase mixture. The invention involves three separation steps: condensation, flash evaporation and membrane separation. The steps are integrated together in such a way as to provide a good separation between the components, and to avoid creation of secondary streams that need additional treatment. The invention is particularly useful for separation of low molecular weight organic compounds from other gases.

57 Claims, 9 Drawing Sheets

5,755,855

SEPARATION PROCESS COMBINING CONDENSATION, MEMBRANE SEPARATION AND FLASH EVAPORATION

FIELD OF THE INVENTION

The invention concerns separation of gas mixtures. Specifically, the invention concerns such separation by a combination of condensation, flash evaporation and membrane separation.

BACKGROUND OF THE INVENTION

It is frequently the case in the chemical, oil and gas industries, and elsewhere, that a gas-phase mixture that includes one or more relatively low-boiling components has to be separated. In principle, many separation techniques are available, including absorption, adsorption, condensation, cryogenic distillation, membrane separation and so on. The optimum technique depends on the specifics of the situation and is influenced by capital outlay, operating costs, energy consumption, physical and chemical properties of the components, value of the components, environmental protection issues, safety and reliability concerns and other factors.

If the boiling points of the components differ, low-temperature condensation and cryogenic distillation are technically possible, but may be impractical, for example because of high refrigeration costs or the need for extensive pretreatment to remove components that might freeze and plug the system.

Adsorbents and absorbents are component specific and not infrequently are problematic to regenerate or dispose of.

Membrane separation is currently available only for a limited number of gases and may not be able to produce a product of sufficiently high purity.

Thus, although numerous gas separations are carried out routinely, on a large scale throughout industry, there remains a need for better separation methods, particularly in certain areas.

SUMMARY OF THE INVENTION

The invention is a process for separating two components of a gaseous mixture, both components having boiling points at 1 atm pressure of about 0° C. or less. The invention involves three separation steps: condensation, flash evaporation and membrane separation.

The steps are integrated together in such a way as to provide a good separation between the components, to avoid, as far as possible, creation of secondary streams that need additional treatment, and to be cost- and energy-efficient.

To applicants' knowledge, such an integrated combination of steps has not previously been used for this type of separation.

In a basic embodiment, the process of the invention includes the following steps:

(a) optionally compressing the gas mixture;

(b) cooling the gas mixture so that a portion of the mixture condenses, resulting in condensed and uncondensed portions;

(c) flashing the condensed portion to achieve additional removal of the lower-boiling of the two components, creating a more enriched higher-boiling component product;

(d) treating the uncondensed portion in a membrane separation unit, thereby creating a more enriched lower-boiling component product and a mixed stream; and, optionally;

(e) recirculating the flashed gas within the process for additional treatment;

(f) recirculating the mixed stream within the process for additional treatment.

In this way, a better separation result is achieved than would be practically possible with any of the unit separation operations alone. Where recirculation of both the flashed gas and the mixed stream is practiced, the process produces only two streams: the bottom stream from the flash step, which may be drawn off as a liquid or allowed to vaporize; and the purified stream from the membrane separation unit. In many cases, the process may be configured so that the compositions of both of these streams render them suitable for use, reuse or discharge as desired without additional treatment. It is possible, and sometimes desirable, to recirculate the flashed gas, but to send the mixed gas stream from the membrane unit to some other use or treatment. Likewise, it is sometimes desirable to recirculate the mixed gas stream, but to send the flashed gas to some other destination than within the process itself.

In the basic embodiment described above, the condensation step involves both optional compressing and cooling of the gas mixture. Sometimes the gas stream may already be at high pressure before entering the process, so that chilling but no additional compression is needed to take the stream beyond the dew point and produce partial condensation.

Flash evaporation is generally accomplished by lowering the pressure of the condensate, such as through an expansion valve, but can also be done by raising the condensate temperature, or a combination of pressure release and heating.

The membrane separation step may use a membrane selective for the higher-boiling or the lower-boiling component, as convenient. In general, it is preferred if the membrane be selective for the minor component of the stream, so that this component is preferentially permeated and enriched in the permeate stream. A separation done in this manner typically uses less membrane area than a separation in which the bulk of the stream to be treated has to pass through the membrane. However, separations in which the major component permeates preferentially can be useful also, and are within the scope of the invention.

If the membrane is selective for the higher-boiling component, then the permeate stream will be the mixed stream that can be returned for additional treatment. Conversely, if the membrane is selective for the lower-boiling component, the residue stream will be the mixed stream that can be returned for additional treatment.

All of the unit operations may be performed as single-stage operations, or themselves may be carried out in multiple sub-steps.

In a most preferred embodiment, the process involves the following steps:

(a) compressing the gas mixture to a pressure no higher than about 1,000 psig;

(b) cooling the gas mixture to a temperature no lower than about −40° C.;

steps (a) and (b) causing partial condensation of the gas mixture and resulting in a condensed portion enriched in the higher-boiling component and an uncondensed portion enriched in the lower-boiling component;

(c) flashing the condensed portion to at least partially remove additional amounts of the lower-boiling component as a flash stream, thereby creating a more-enriched higher-boiling component product;

3

(d) treating the uncondensed portion in a membrane separation unit containing a membrane selective for the higher-boiling component, producing a permeate stream enriched in the higher-boiling component and a residue stream enriched in the lower-boiling component;

(e) recirculating the flash stream to the condensation step;

(f) recirculating the permeate stream to the condensation step.

Both the flash evaporation step and the membrane separation step can produce streams that are significantly colder, such as 10° C., 20° C. or more colder than their respective feed streams. These streams can be used to provide cooling for the condensation step. In another aspect, therefore, the invention includes heat integration steps that can, in favorable cases, provide all or most of the cooling capacity required for condensation.

The process may be applied to any gaseous mixture that contains two components having boiling points at 1 atm pressure of about 0° C. or less, and for which the individual unit separation operations provide at least some measure of separation.

Specific exemplary separations to which the process of the invention can be applied include, but are not limited to:

1. Separation of the light $C_{2+}$ hydrocarbons from hydrogen and methane produced from ethylene and propylene cracker operations, and refining operations, such as fluid catalytic cracking (FCC).
2. Separation of the light $C_{3+}$ hydrocarbons from methane and ethane in natural gas processing operations.
3. Separation of the light $C_{2+}$ hydrocarbons from purge gas used in polyolefin manufacturing operations.
4. Separation of nitrogen from low-boiling halogenated solvents, such as methyl chloride, CFC-12 and Halon 1301.
5. Separation of hydrogen and nitrogen from ammonia.

It is an object of the invention to provide processes for separating gaseous mixtures containing components having boiling points below 0° C.

It is an object of the invention to provide processes for separating low molecular weight hydrocarbons, such as $C_1$–$C_6$ monomers, from other gases.

Additional objects and advantages will be apparent from the description of the invention to those skilled in the art.

It is to be understood that the above summary and the following detailed description are intended to explain and illustrate the invention without restricting its scope.

4

Figure 7:
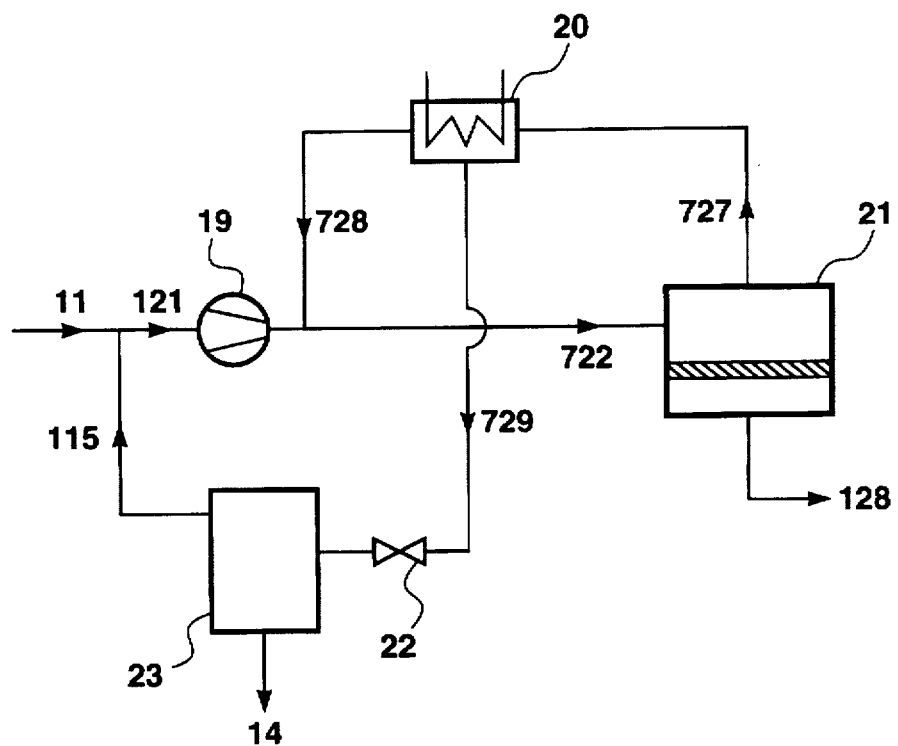

FIG. 7 is a schematic drawing of an embodiment of the invention in which a membrane selective for the lower boiling point component is used and in which the condenser is positioned in the membrane residue line.

Figure 8:
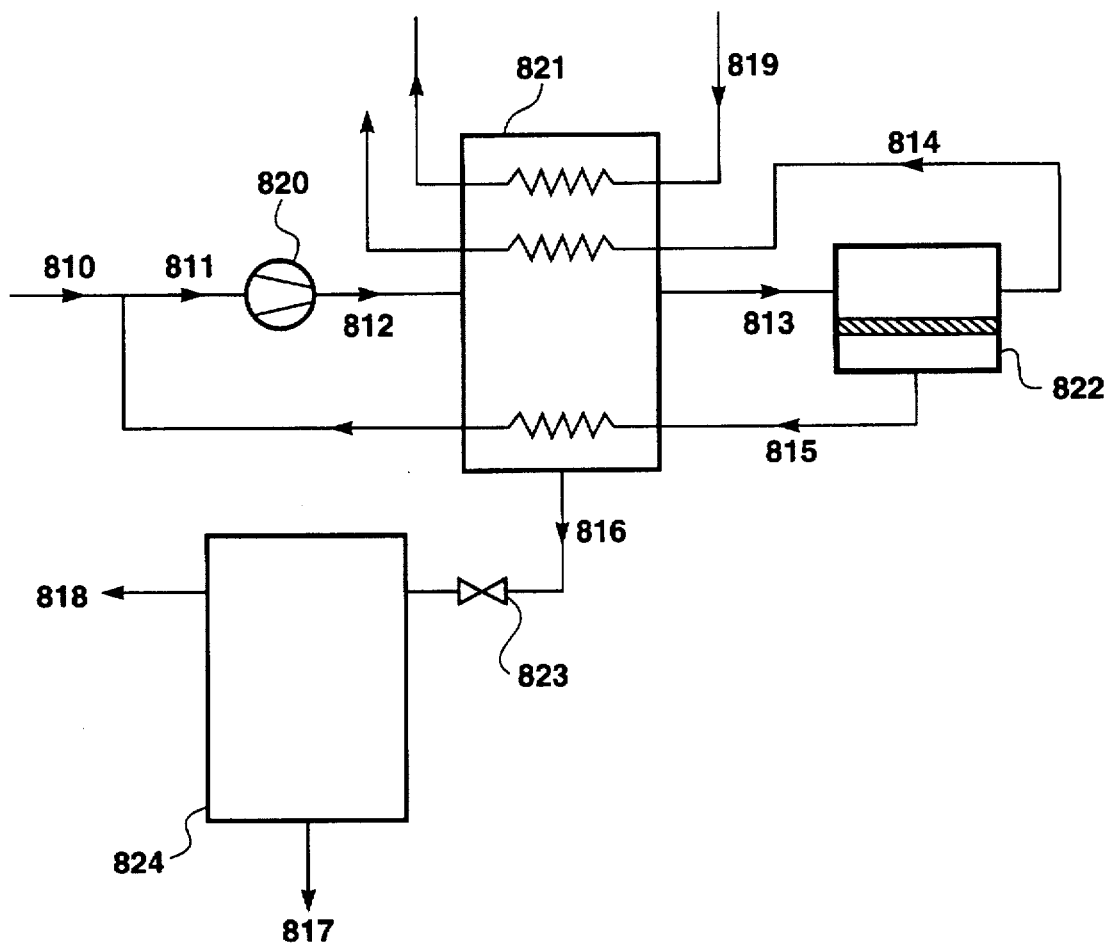

FIG. 8 is a schematic drawing showing an embodiment of the invention in which cooling for the condenser is provided by the membrane residue and permeate streams.

Figure 9:
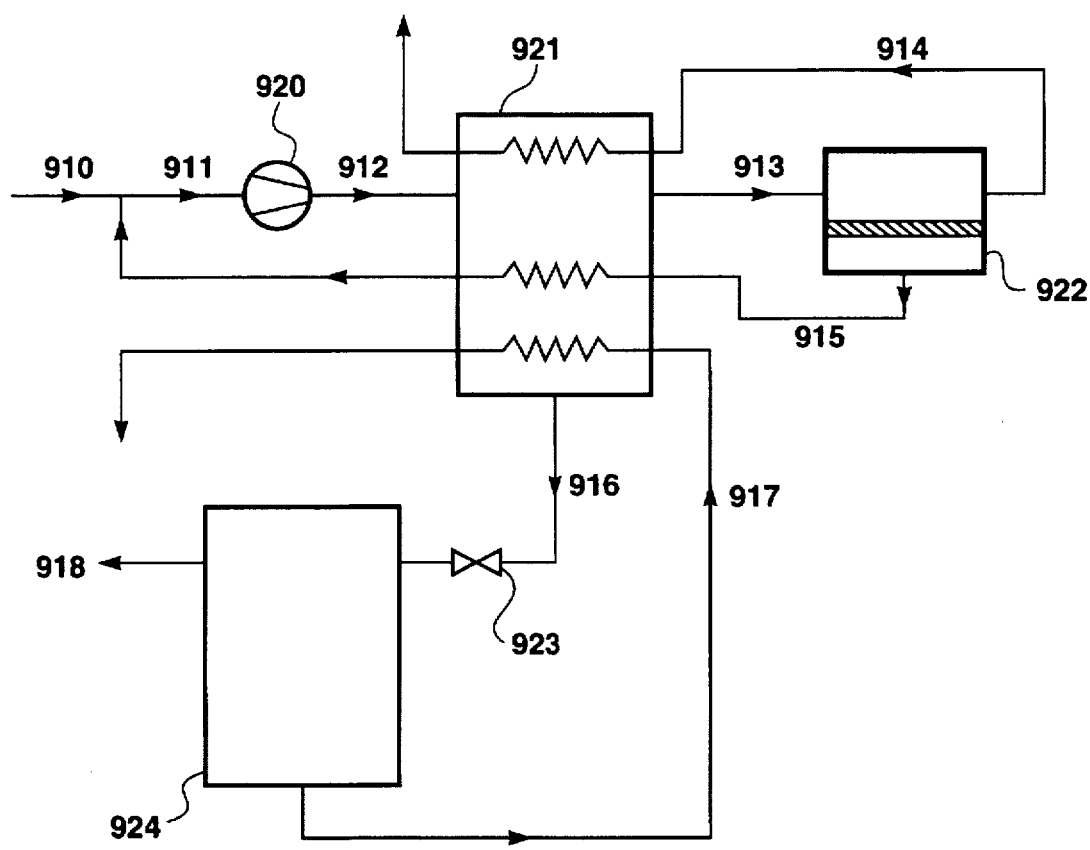

FIG. 9 is a schematic drawing showing an embodiment of the invention in which cooling for the condenser is provided by the membrane residue and permeate streams and the liquid stream from the flash tank.

DETAILED DESCRIPTION OF THE INVENTION

The term gas as used herein means a gas or a vapor.

The term $C_{2+}$ hydrocarbon means a hydrocarbon having at least two carbon atoms; the term $C_{3+}$ hydrocarbon means a hydrocarbon having at least three carbon atoms; and so on.

The term light hydrocarbon means a hydrocarbon molecule having no more than about six carbon atoms.

All percentages herein are by volume unless otherwise stated.

The invention is a process for separating two components of a gaseous mixture, both having boiling points at 1 atm pressure of 0° C. or less, the boiling points being different, so that one component is designated herein as the higher-boiling component and the other is designated herein the lower-boiling component. The invention is particularly useful for separating mixtures of a low-boiling point organic component and a lower-boiling point gas, such as hydrogen, nitrogen, oxygen, methane, ethane or carbon monoxide. The process of the invention is also useful for separating organic mixtures or inorganic mixtures.

The invention involves three separation steps: condensation, flash evaporation and membrane separation.

The goal of the condensation step is to bring the gas stream to a pressure/temperature condition beyond the dewpoint of the higher-boiling component, so that a portion of that component will condense out of the gas stream in liquid form. The amount of the higher-boiling component that can be removed from the gas stream in this way will depend on the boiling point of the higher-boiling component, its concentration in the feed, and the operating conditions under which the condensation is performed.

The condensation step may involve chilling or compression alone, but will usually involve both. Compressing the gas raises the dewpoint temperature, so a combination of compression and chilling is generally preferred. Sometimes, however, the gas stream may already be at high pressure or at low temperature before entering the process, so that only compression or chilling is needed to take the stream beyond the dew point and produce partial condensation.

It is desirable to avoid compressing to very high pressures and cooling to very low temperatures, since reaching these conditions requires larger, more powerful compressors and chillers, which adds to the cost and complexity of the process. By very high pressures, we mean pressures in excess of about 1,500 psig. More preferably, the pressure at which the condensation step is operated should be no more than about 1,000 psig, yet more preferably 500 psig, and most preferably no more than about 250 psig, depending on the feed stream being separated. Of course, if the raw stream to be treated is already at very high pressure, it is desirable to take advantage of that pressure for the condensation step. For example, a natural gas stream may have a wellhead pressure as high as 5,000 psig.

By very low temperatures, we mean temperatures below about $-100°$ C. The temperature at which the condensation step is operated should preferably be in the range $10°$ C. to $-100°$ C. More preferably, however, the temperature should be above about $-40°$ C., or in the range $10°$ C. to $-40°$ C. Temperatures down to about the bottom of this range should be possible to reach by single-stage refrigeration, for example using propane as the cooling refrigerant. Most preferably, in situations where one component is high boiling enough to make it possible, the temperature should be above $0°$ C. Temperatures above $0°$ C. can often be reached by simple water cooling, and their use avoids ice formation in the condenser.

The fraction of the higher-boiling condensable component remaining in the condenser vent gas after the condensation step depends on the vapor/liquid equilibrium at the operating conditions under which the condensation step is performed. If the dewpoint is reached at 75 psig and $10°$ C., for example, then compressing the stream to 375 psig and cooling will remove approximately 80% or more of the component in question. If the dewpoint is reached at 15 psig and $-30°$ C., then compressing to 150 psig and cooling to $-30°$ C. will remove at least 90% or more of the component. It is theoretically possible to obtain as much removal as required by creating appropriate conditions of high pressure and low temperature.

In the practice of the invention, however, it is preferable only that the condensation step be designed to remove at least about 50% of the higher-boiling component present in the feed to the condenser, more preferably, at least about 70%. Operation under extreme conditions to achieve 90% or more removal is unnecessary, because the process does not rely on condensation alone to achieve the overall separation. For example, suppose the condensation step removes 50% of the higher-boiling component of the feed gas. If the condensation step is followed by a membrane separation step that can remove 80% of the higher-boiling component reaching it, then the total removal obtained is 90%. If the condensation step removes 80%, and is followed by a membrane separation step that also removes 80%, then the total removal is 96%. If the condensation step removes 80% and the membrane separation step 90%, the total removal is 98%.

The preferred goal of the process is to separate the gas mixture into only two product streams: the treated stream exiting after the membrane separation step and the treated stream exiting as the bottom stream from the flash evaporation step. Typically, there will be composition targets for each stream. For example, the lower-boiling component product stream might be required to contain no more than 5%, 1%, 500 ppm, 100 ppm or 10 ppm of the higher boiler, and the higher-boiling component product stream might be required to contain no more than 5%, 1%, 500 ppm, 100 ppm or 10 ppm of the lower boiler. Depending on the original composition of the mixture, this may mean 50%, 80%, 90%, 99% or 99.9%, for example, removal of the minor component from the major component, coupled with 5-fold, 10-fold, 100-fold, 1,000-fold or 10,000-fold enrichment of the minor component stream.

The conditions under which the condensation step is carried out influence the compositions of both the condensed and uncondensed portions. If the condensation conditions are beyond the dewpoint of the lower-boiling component, then that component also will start to condense. Even if the conditions do not reach the dewpoint of the lower-boiling component, it will likely have the capacity to dissolve in the liquefied higher-boiling component to some extent, and to partition into the liquid phase. For both reasons, the higher the pressure and the lower the temperature at which the condensation is performed, the greater are the amounts of the lower-boiling component that will be present in the condensate. For these reasons also, it is preferable to avoid extremes of pressure and temperature in the condensation step, since these will promote a less-enriched condensate.

If the condensation step necessitates cooling to below $0°$ C., and the gas stream contains water vapor, two chillers in series may optionally be used. The first chiller is maintained at a temperature close to $0°$ C., and removes most of the entrained water. The second chiller is maintained at the lower temperature necessary to remove a substantial fraction of the higher-boiling component. Some water vapor will inevitably pass into the second chiller but the use of the first chiller will significantly reduce the need for defrosting the second. Alternatively, the condensation step may include another type of dehydration process through which the gas stream passes before it enters the condenser.

Turning now to the flash evaporation step, this may be carried out by any convenient technique. Typically, flashing is achieved by letting down the pressure of the liquid to be flashed, thereby achieving essentially instantaneous conversion of a portion of the liquid to the gas phase. This may be done by passing the liquid through an expansion valve into a receiving tank or chamber, or any other type of phase separation vessel, for example. The released gas can be drawn off from the upper part of the chamber; the remaining liquid can be withdrawn from the bottom. It is often convenient to carry out the flash evaporation by pressure release alone. For example, pressure reduction may be required for other reasons before the condensed liquid higher-boiling product can be transported or stored. Furthermore, the remaining liquid is cooled substantially as the vapor is flashed off, and can then be used for cooling in the condensation step or elsewhere.

Alternatively, flash evaporation can be achieved by sending the liquid to a vessel and raising the temperature, while maintaining the pressure at its previous value. Using only a temperature change to produce flashing has some advantages, in that the gas released by heating is at a high pressure and can be recirculated back to the feed gas stream or subjected to some other separation step without additional compression. This lowers overall processing costs in some cases. However, much better removal of the lower-boiling point gas is usually obtainable per unit pressure change than per unit temperature change, as shown in the examples below.

As yet another alternative, a combination of pressure lowering and heating can be used. This may be the most efficient technique when it is desired to drive off essentially all of the dissolved gas, for example. Those of skill in the art will appreciate that the decision as to which method to use in any specific set of circumstances should be determined taking into account the environment in which the process is to be carried out, and the relative importance of product purity, operating costs and other factors.

As a general guideline, we favor using pressure reduction, which is simple and reliable.

Whether lowering the pressure or raising the temperature, or both, it is preferred to bring the condensate to a condition just a little above the saturation vapor pressure of the higher-boiling component at that temperature. This prevents loss of the higher-boiling component into the gas phase. By a little above the saturation vapor pressure, we mean most preferably about 0–50 psig above the saturation vapor pressure at the flashing temperature.

The amounts and compositions of the flashed gas and the product liquid depend on the changes of pressure and temperature to which the condensate is subjected. Generally, the results are very close to a theoretical one-stage evaporation step and can be calculated to good reliability from tabulated thermodynamic data.

In basic embodiments of the invention, flash evaporation is carried out in one stage, to produce one flashed gas stream and a residual liquid product. Optionally, flashing may be carried out in two or more stages, such as by lowering the pressure incrementally. This type of operation produces several gas streams at different pressures. By removing at least a portion of the gas at high pressure, the cost of compression of the remainder is reduced. This type of multistage flash evaporation is particularly suited to situations where the condensation pressure is relatively high, such as may occur in natural gas treatment, for example.

The third unit separation process is membrane separation. The membrane unit contains a membrane that exhibits a substantially different permeability for the higher-boiling component than for the lower-boiling component. It may be relatively permeable to the higher-boiling component but relatively impermeable to the lower-boiling component, or relatively permeable to the lower-boiling component but relatively impermeable to the higher-boiling component.

The permeability of a gas or vapor through a membrane is a product of the diffusion coefficient, D, and the Henry's law sorption coefficient, k. D is a measure of the permeant's mobility in the polymer; k is a measure of the permeant's sorption into the polymer. The diffusion coefficient tends to decrease as the molecular size of the permeant increases, because large molecules interact with more segments of the polymer chains and are thus less mobile. The sorption coefficient depends, amongst other factors, on the condensability of the gas.

Depending on the nature of the polymer, either the diffusion or the sorption component of the permeability may dominate. In rigid, glassy polymer materials, the diffusion coefficients tends to be the controlling factor and the ability of molecules to permeate is very size dependent. As a result, glassy membranes tend to permeate small, low-boiling molecules, such as nitrogen or oxygen, faster than larger, more condensable molecules, such as organic molecules. For rubbery or elastomeric polymers, the difference in size is much less critical, because the polymer chains can be flexed, and sorption effects generally dominate the permeability. Elastomeric materials, therefore, tend to permeate large, condensable molecules faster than small, low-boiling molecules.

The choice of whether to use a glassy or an elastomeric membrane for the membrane separation step will depend, therefore, on the separation to be performed. Generally, we prefer to use a membrane selective for the minor component of the stream to be separated, so that this component is preferentially permeated and enriched in the permeate stream. A separation done in this manner typically uses less membrane area than a separation in which the bulk of the stream to be treated has to pass through the membrane. Therefore, if the minor component is the higher-boiling, more condensable, component, we prefer to use an elastomeric membrane. Likewise, if the minor component is the lower-boiling, less condensable, component, we prefer to use a glassy membrane.

Examples of polymers that can be used to make elastomeric membranes, include, but are not limited to, nitrile rubber, neoprene, polydimethylsiloxane (silicone rubber), chlorosulfonated polyethylene, polysilicone-carbonate copolymers, fluoroelastomers, plasticized polyvinylchloride, polyurethane, cis-polybutadiene, cis-polyisoprene, poly(butene-1), polystyrene-butadiene copolymers, styrene/butadiene/styrene block copolymers, styrene/ethylene/butylene block copolymers, thermoplastic polyolefin elastomers, and block copolymers of polyethers, polyamides and polyesters.

Examples of polymers that can be used to make glassy membranes include, polysulfones, polyimides, polyamides, polyaramides, polyphenylene oxide, polycarbonates, ethylcellulose or cellulose acetate.

In some circumstances, it is necessary, or better, to use a membrane through which the major component permeates preferentially. For example, if the major component is an organic compound, and the minor component is nitrogen, which obviously has a very low boiling point, the guideline above would suggest using a glassy membrane for most separations. However, those of skill in the art will appreciate that glassy membranes selective for nitrogen over organics have low permeabilities, and that in this case the membrane-separation step might better be performed with a nitrogen-rejecting membrane. Similarly, if a membrane with very high selectivity for the major component is available, it might be desirable to use it, even though membranes with some selectivity in the other direction exist.

Another exception to the general guidelines above is the use of super-glassy polymer membranes to remove condensable organic components. Super-glassy polymers have a rigid structure, high glass transition temperatures, typically above 100° C., 200° C. or higher, and would normally be expected to be selective for smaller, less condensable molecules over larger, more condensable molecules. However, membranes made from certain of these polymers that have unusually high free volume within the polymer material have been found to exhibit anomalous behavior, in that they preferentially permeate larger, more condensable molecules over smaller, less condensable molecules. The best known super-glassy polymer identified to date is poly (trimethylsilylpropyne) [PTMSP], the use of which to preferentially separate condensable components from lower-boiling, less condensable components is described in U.S. Pat. No. 5,281,255, for example. This type of membrane would be useful in the present invention as a membrane selective for some higher-boiling components, particularly organic components.

The membrane may take the form of a homogeneous film, an integral asymmetric membrane, a multilayer composite membrane, a membrane incorporating a gel or liquid layer or particulates, or any other form known in the art. If elastomeric membranes are used, the preferred form is a composite membrane including a microporous support layer for mechanical strength and a rubbery coating layer that is responsible for the separation properties. If glassy membranes are used, an integral asymmetric membrane is the preferred form.

The membranes may be manufactured as flat sheets or as fibers and housed in any convenient module form, including spiral-wound modules, plate-and-frame modules and potted hollow-fiber modules. The making of all these types of membranes and modules is well known in the art. Flat-sheet membranes in spiral-wound modules are our most preferred choice.

Whatever their composition and structure, the membranes should preferably have a selectivity for the faster permeating component over the other component of at least 3, more preferably at least 5 and most preferably at least 10.

To achieve a high flux of the preferentially permeating component, the membrane layer responsible for the separation properties should be thin, preferably, but not necessarily, no more than 30 µm thick, more preferably no more than 20 µm thick, and most preferably no more than 5 µm thick. If super-glassy membranes are used, the membranes may be thicker, such as 50 µm thick or even substantially more, such as 100 µm or more, because these membranes have extraordinarily high transmembrane fluxes.

A driving force for transmembrane permeation is typically provided by a pressure difference between the feed and permeate sides of the membrane. This pressure difference can be achieved by compressing the feed stream, by drawing a vacuum on the permeate side of the membrane, or both.

A single-stage membrane separation operation using a membrane with a selectivity of about 10 can typically remove up to about 80 or 90% of the preferentially permeating component from the feed stream and produce a permeate stream that has five times or more the concentration of that component of the feed gas. This degree of separation is adequate for many applications. If the residue stream requires further purification, it may be passed to a second bank of modules for a second processing step. If the permeate stream requires further concentration, it may be passed to a second bank of modules for a second-stage treatment. Such multistage or multistep processes, and variants thereof, will be familiar to those of skill in the art, who will appreciate that the membrane separation step may be configured in many possible ways, including single-stage, multistage, multistep, or more complicated arrays of two or more units in series or cascade arrangements. Examples of such arrangements are described in U.S. Pat. No. 5,256,295, incorporated herein by reference in its entirety.

In some circumstances, discussed in more detail below, the residue and/or permeate streams from the membrane separation step may be used to provide or supplement cooling for the condensation step.

Figure 1:
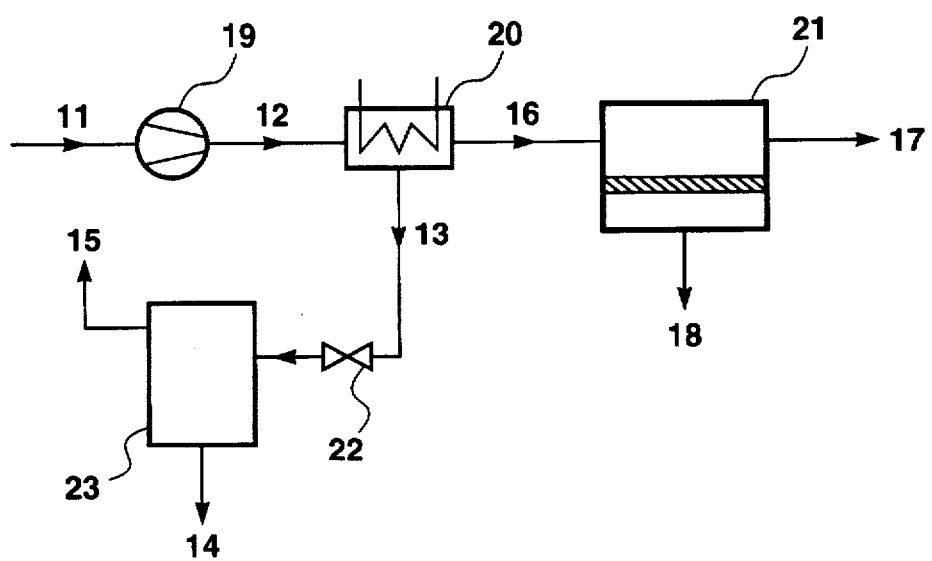
FIG. 1 is a schematic drawing of an embodiment of the invention that uses compression to facilitate condensation.
Figure 2:
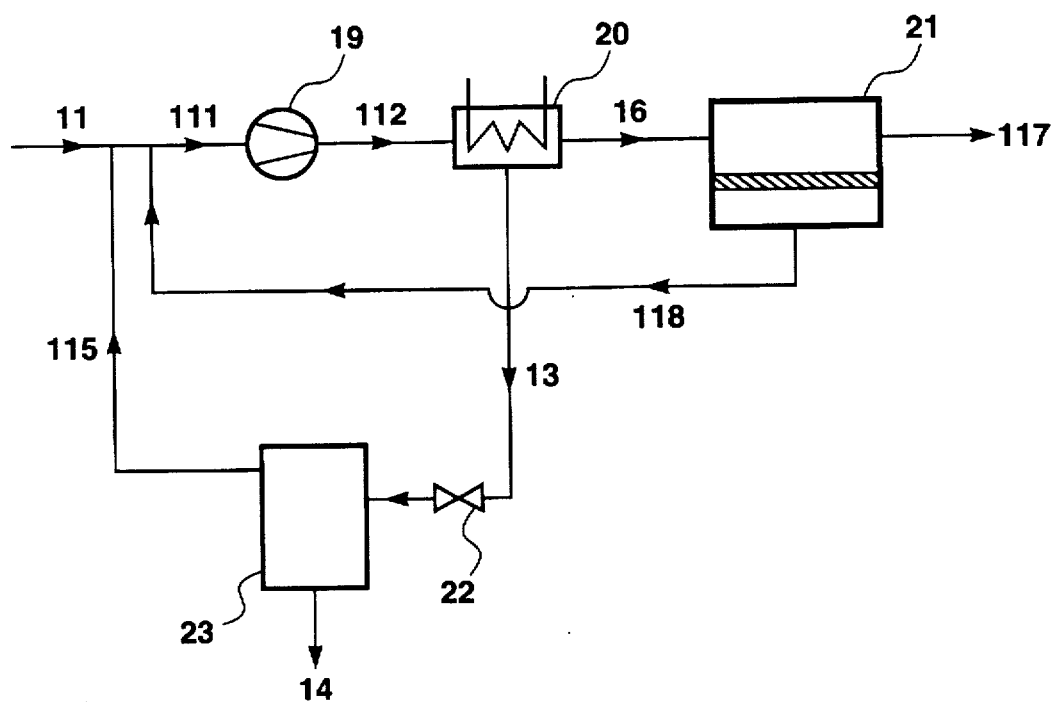
FIG. 2 is a schematic drawing of an embodiment of the invention using a membrane selective for the higher-boiling component of the gas mixture.
Figure 3:
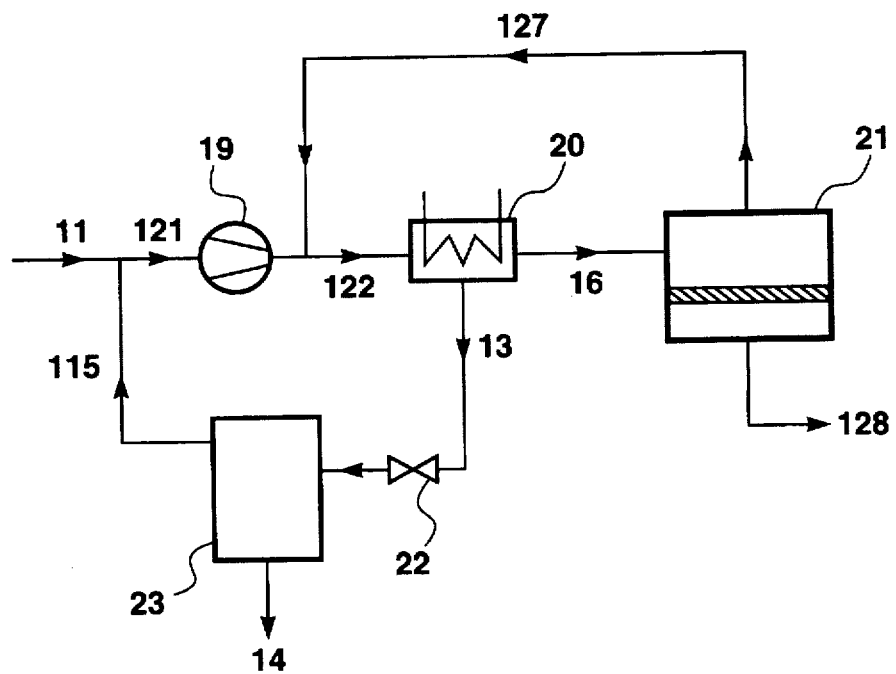
FIG. 3 is a schematic drawing of an embodiment of the invention using a membrane selective for the lower-boiling component of the gas mixture.

Turning now to the figures, FIGS. 1, 2 and 3 show various embodiments of the invention. FIG. 1 shows a process in which the condensation step is carried out, as it typically, but not necessarily, will be, by a combination of both compression and cooling, and in which the flash evaporation step is carried out, as it typically, but not necessarily, will be, by pressure reduction. Referring now to this figure, feed stream, 11, contains the higher- and lower-boiling components to be separated. The stream passes through compressor, 19, which produces compressed stream, 12. Stream 12 then passes through heat exchanger or chiller, 20, to lower the temperature, the combination of compression and cooling resulting in the formation of a condensed stream, 13, containing the higher-boiling component, but also containing some dissolved or condensed lower-boiling component, and an uncondensed stream, 16, still containing some of the higher-boiling component. The condensed stream or condensate, 13, then passes through expansion valve, 22, thereby reducing the pressure, and into flash tank, 23. The resulting volume of gas that is generated contains the lower-boiling component, plus some higher-boiling component. It should be noted that no destination for the flashed gas stream, 15, is indicated in FIG. 1, and that the invention encompasses both embodiments in which the flashed gas is recirculated and embodiments in which it is not. Although it will frequently be desirable to recirculate this stream, some other destination for the gas may occasionally be more suitable. For example, in natural gas processing, the flashing step may be releasing methane and ethane from $C_{3+}$ hydrocarbon liquid. In this case, it may be more efficient to use the flashed gas, with its high methane content, as a low-pressure fuel gas than to compress and recirculate it.

The liquid product, which has now been twice enriched in the higher-boiling component, is withdrawn as stream, 14. No destination for this stream is indicated in the figure. Typically, it may be used or reused somewhere in the operation that gave rise to stream 11, sold or sent for further processing. During the flashing step, the energy taken to evaporate the flash gas results in a significant lowering of the temperature of the remaining product liquid, such as 20° C., 30° C. or more. Optionally, therefore, this stream can be used to cool or partially cool the incoming stream, such as by running the product stream against the incoming stream in heat exchanger or chiller, 20, before sending it to another destination.

Stream 14 as it emerges from the flash tank is liquid, but may be allowed to vaporize and be withdrawn from the process as a gaseous product. This is often desirable if the product is to be transported or stored, for example.

The uncondensed stream, 16, is fed to a membrane separation unit, 21, containing a membrane that is selectively permeable to either the higher-boiling or lower-boiling component. In many cases, a pressure difference between the feed and permeate sides of the membrane large enough to provide sufficient driving force for transmembrane permeation may be provided by the upstream compressor, 19. To provide additional driving force, if desired, a vacuum pump could be connected on the permeate side of the membrane, so that stream 18 is under partial vacuum. Alternatively, stream 16 could be subjected to additional compression. The membrane unit produces two streams, a residue stream, 17, and a permeate stream, 18. Depending on which way the membrane is selective, one of these is the lower-boiling product stream and the other is the mixed stream. The mixed stream is usually passed back to the inlet side of the compressor or the chiller. However, as with the flashed gas stream, another destination may make more sense in the context in which the invention is carried out. For example, in a refinery operation, the process of the invention might be used to separate hydrogen from mixed light hydrocarbons. The light hydrocarbon membrane permeate stream may be better used as fuel than recirculated, to what perhaps is a physically distant upstream point in the refinery.

For simplicity, the condenser or chiller in FIG. 1 is identified by a single box, 20, from which the condensate liquid and remaining gas are shown emerging as discrete streams. It will be appreciated that, in practice, the condenser will often comprise a chiller, which produces a gas/liquid mixture, and a phase separator, in which the phases are separated and from which they are withdrawn as discrete streams. The same comment applies to FIGS. 2–9.

Turning now to FIG. 2, this shows an embodiment of the invention in which the membrane separation unit contains a membrane that is selectively permeable to the higher-boiling component. Where the figure corresponds to FIG. 1, the same reference numbers with the same meanings are used. In FIG. 2, the residue stream, 117, is the lower-boiling component enriched product stream. The permeate stream, 118, which is enriched in higher-boiling component compared with membrane feed stream, 16, is returned to the inlet side of the compressor for further processing, as is the flashed gas stream, 115. Inlet stream, 111, passes through the compressor, 19 and emerges as compressed stream, 112, which is then treated as in FIG. 1.

In FIG. 2, both of the streams recirculated to the condensation step are shown as returned to mix with the feed stream upstream of the compressor, 19. Alternatively, these streams could be recompressed separately and returned for mixing with the raw purge gas after compressor, 19, but upstream of condenser, 20.

FIG. 3 shows an embodiment of the invention in which the membrane separation unit contains a membrane that is selectively permeable to the lower-boiling component. Where the figure corresponds to FIGS. 1 and 2, the same reference numbers with the same meanings are used. In FIG. 3, the permeate stream, 128, is the lower-boiling component enriched product stream. The residue stream, 127, is the higher-boiling component enriched mixed stream. This stream has not passed through the membrane and remains at high pressure, subject only to relatively slight pressure drops that may occur along the length of the membrane modules. Stream 127 may, therefore, often be returned without recompression between the compressor and chiller, as shown in the figure. In this embodiment, streams 11 and 115 form the inlet stream, 121, to the compressor, and compressed stream, 122, forms the inlet stream to the heat exchanger or chiller. An optional variation on the design of FIG. 3 is to position the condenser in the membrane residue line rather than the membrane feed line, as shown in FIG. 7. The advantage of this design is that, by the time the stream for treatment reaches the condenser, it has already been enriched in the more condensable component by passage through the membrane unit. In FIG. 7, stream, 722, is the feed to the membrane unit. The residue stream, 727, still at high pressure, and now enriched in the higher-boiling component compared with stream 722, is passed to chiller or condenser, 20. Uncondensed stream, 728, is recirculated upstream of the membrane unit. Condensate stream, 729, is subjected to flashing as in the FIG. 3 embodiment.

As stated above, the process of the invention may be applied to separate two gaseous mixture components having boiling points at 1 atm below about 0° C., so long, of course, as the individual unit separation operations provide at least some measure of separation. Although the invention can be applied to separate two gases of extremely low boiling points, such as methane and nitrogen for example, we believe it will be of greatest value in separating components having slightly higher boiling points, such as above about −100° C., (that is, in the approximate range 0° C. to −100° C.) from each other, or from a gas of lower boiling point below about −100° C.

Examples of gases with boiling points above about −100° C. that may be separated from each other or from other components include, but are not limited to, the following: ammonia (bp −78° C.), carbon dioxide (in compositions where it will liquefy rather than solidify), sulfur dioxide (bp −73° C.), hydrogen sulfide (bp −86° C.), ethylene (bp −104° C.), ethane (bp −89° C.), propylene (bp −47° C.), propane (bp −42° C.), n-butane (bp −0.5° C.), isobutane (bp −12° C.), butylene (bp −7° C.), and acetylene (bp −84° C.), as well as numerous substituted hydrocarbons, and in particular halogenated hydrocarbons such as vinyl chloride (bp −13° C.), CClF$_3$ (bp −81° C.), CCl$_2$F$_2$ (bp −30° C.), CHF$_3$ (bp −82° C.) and CHClF$_2$ (bp −41° C.).

Examples of gases with boiling points below about −100° C. that can be separated from other components or from each other by the processes of the invention include, but are in no way limited to, methane (bp −161° C.), oxygen (bp −183° C.), argon (bp −186° C.), nitrogen (bp −196° C.), helium (bp −269° C.) and hydrogen (bp −253° C.).

Some representative, non-limiting separations for which the processes of the invention are suited are given in Table 1. The table lists processes that give rise to the stream to be treated and designates the higher-boiling and lower-boiling components of that stream between which separation could be obtained.

TABLE 1

| Process producing gas stream to be treated | Higher-boiling point component(s) of stream and boiling point (°C.) | | Lower-boiling point component(s) of stream and boiling point (°C.) | |
|---|---|---|---|---|
| Ethylene cracking | Ethylene | −104 | Hydrogen | −253 |
| | Ethane | −89 | Methane | −161 |
| | Propylene | −47 | | |
| | Propane | −42 | | |
| | n-Butane | −0.5 | | |
| Polypropylene resin purge venting | Propylene | −47 | Nitrogen | −196 |
| Natural gas liquids (NGL) recovery | Propane | −42 | Methane | −161 |
| | n-Butane | −0.5 | Ethane | −89 |
| | C$_{5+}$ components | >20 | | |
| Methyl chloride degassing | Methyl chloride | −24 | Nitrogen | −196 |
| Ammonia synthesis | Ammonia | −78 | Hydrogen | −253 |
| | | | Nitrogen | −196 |
| Halon degassing | Halon 1301 | −58 | Nitrogen | −196 |
| Sulfur dioxide degassing | Sulfur dioxide | −73 | Nitrogen | −196 |
| | | | Oxygen | −183 |
| Polyvinyl chloride reactor purging | Vinyl chloride | −13 | Nitrogen | −196 |

The processes of the invention are especially attractive compared with other separation alternatives for:

1. Separation of the light C$_{2+}$ hydrocarbons from hydrogen and methane produced from ethylene and propylene cracker operations, and refining operations, such as fluid catalytic cracking (FCC).
2. Separation of the light C$_{3+}$ hydrocarbons from methane and ethane in natural gas processing operations.
3. Separation of the light C$_{2+}$ hydrocarbons from purge gas used in polyolefin manufacturing operations.
4. Separation of nitrogen from low-boiling halogenated solvents, such as methyl chloride, CFC-12 and Halon 1301.
5. Separation of hydrogen and nitrogen from ammonia.

To illustrate this point, the first application of our process that we discovered is in the treatment of vent streams from polyolefin manufacturing plants. In a typical propylene or ethylene polymerization process, the raw polymer product, which is usually in powder form, contains significant amounts of unreacted monomer, and may contain small amounts of solvents, catalysts, stabilizers, other hydrocarbons or any other materials, depending on the process used. To remove these contaminants, the raw polymer is passed to large bins, where nitrogen is used to purge them out. The vent gas from this step may contain 80–90% nitrogen, the remainder being C$_2$ and/or C$_3$ monomer, other hydrocarbons, etc. In many plants in operation today, this vent gas is flared, thereby destroying monomer with a potentially high value. Even if the stream is chilled to −120° C., propylene and ethylene recovery is poor.

The process of the invention offers a better alternative. For example, from purge streams containing about 75% nitrogen/25% hydrocarbon, the process can produce a higher-boiling point component (hydrocarbon) product stream containing essentially no nitrogen, and a lower-boiling point component (nitrogen) product stream containing 99% nitrogen. Fuller details of this particular process are described in co-owned and co-pending Ser. No. 08/789,377, entitled "Monomer Recovery Process", which is incorporated herein by reference in its entirety.

Details of a process in which ethylene or propylene is separated from other components as part of the manufacture of olefins by steam cracking are given in co-owned and co-pending Ser. No. 08/789,376, entitled "Steam Cracker Gas Separation Process", which is incorporated herein by reference in its entirety.

When the membrane separation step uses a membrane that is organic-selective, that is, is selective in separating an organic component from another component, the residue and permeate streams from the membrane unit may be significantly colder than the membrane feed stream. This phenomenon, which is believed to arise because of Joule-Thomson cooling as the organic vapor expands across the membrane to the permeate side, is likely to occur if the membrane has a reasonably good selectivity for the organic component over another component, such as about 10 or more, the organic component has a reasonably high concentration in the feed to the membrane unit, such as about 5%, 10% or more, and the removal of organic component from the membrane feed into the permeate is reasonably high, such as about 50%, 80%, 90% or more. The phenomenon is discussed in more detail in co-owned and copending Ser. No. 08/788,629, entitled "Membrane Expansion Process for Organic Component Recovery From Gases", which is incorporated herein by reference in its entirety.

Since the conditions mentioned above frequently obtain during the separations to which our process can be applied according to the teachings herein, the membrane residue and permeate streams may typically be 5° C., 10° C. or more colder than the feed to the membrane unit, and it may be both convenient and beneficial to use one or both cold streams from the membrane separation step to provide or supplement cooling for the condensation step.

Such an arrangement is shown in FIG. 8. Turning to this figure, feed stream, 810, is the stream to be treated, which is combined with recirculated membrane permeate stream, 815, to form inlet stream, 811. Stream 811 passes through compressor, 820, to form compressed stream, 812, which then passes through heat exchanger or chiller, 821. In the embodiment shown in this figure, the heat exchanger is cooled by membrane residue stream, 814, membrane permeate stream, 815, and external refrigeration stream, 819. Other arrangements, in which only the residue or the permeate stream are used for cooling, or in which sufficient cooling capacity is extracted from the membrane return streams that no external refrigeration stream 819 is needed are also possible and within the scope of the invention.

The combination of compression and cooling results in the formation of condensed stream, 816, which is passed through expansion valve, 823, and into flash tank, 824. The evolved gas phase, stream 818, can be discharged to any destination, or returned as in FIG. 2 to the inlet side of the compressor for reprocessing. The liquid organic product is withdrawn as stream, 817.

The uncondensed stream, 813, is fed to membrane separation unit, 822. The membrane unit contains a membrane that is selective for the organic component over another component of the feed gas from which it is to be separated. The membrane unit produces residue stream, 814, which is the purified, organic-depleted stream, and permeate stream, 815, the organic-enriched stream, which is returned via the heat exchanger to the condensation step.

Another preferred embodiment that takes advantage of heat integration is shown in FIG. 9. Referring to this figure, feed stream, 910, is the feed stream to the process, which is combined with recirculated membrane permeate stream, 915, to form inlet stream, 911. Stream 911 passes through compressor, 920, to form compressed stream, 912, which then passes through heat exchanger or chiller, 921. In this embodiment, the heat exchanger is cooled by membrane residue stream, 914, membrane permeate stream, 915, and the cold liquid organic stream, 917, from the flash evaporation step. Thus, in this case, no external refrigeration need be supplied.

The combination of compression and cooling results in the formation of condensed stream, 916, which is passed through expansion valve, 923, and into flash tank, 924. The evolved gas phase, stream 918, can be discharged or recirculated. For even more cooling capacity, stream 918 could also be passed through heat exchanger, 921. The organic product, which in this case has been warmed by passage through the heat exchanger, and may therefore be in the vapor phase rather than liquid, is withdrawn as stream, 917.

The uncondensed stream, 913, is fed to membrane separation unit, 922. The membrane unit contains a membrane that is selective for an organic component of the gas. The membrane unit produces residue stream, 914, which is the purified organic-depleted stream, and permeate stream, 915, the organic-enriched stream, which is returned via the heat exchanger to the condensation step.

Other configurations that offer attractive heat integration possibilities in specific situations will be apparent to those of skill in the art based on the above teachings.

The invention is now illustrated in further detail by specific examples. These examples are intended to further clarify the invention, and are not intended to limit the scope in any way.

EXAMPLES

Example 1

As the first step in the production of ethylene or propylene, a hydrocarbon feedstock is conventionally cracked with steam and carbon dioxide is removed using an amine absorption process. The gas leaving the operation typically contains 40–50% hydrogen and methane, both of which must be removed before the $C_{2+}$ hydrocarbons are separated by a distillation train. To date, this has been accomplished by compressing the gas mixture to 500 psig and cooling to below −100° C. This separates the $C_{2+}$ components from the hydrogen. Some methane remains in the gas phase with the hydrogen and some is dissolved in the liquid hydrocarbon, which is subsequently sent to a demethanizer for removal of the remaining methane, followed by a series of high pressure/low temperature distillation operations that produce the various fractionated hydrocarbon streams.

The removal of hydrogen and methane from the $C_2$–$C_4$ hydrocarbons after the cracking and carbon dioxide removal steps can be accomplished by the process of the invention.

A computer calculation was performed using ChemCad III software (Chemstations Inc., Houston, Tex.) to model the separation. The feed stream composition was assumed to be 45 mol % hydrogen and methane, 35 mol % ethylene, the balance other light hydrocarbons. It was assumed that the process shown in FIG. 2 was used, that raw stream, 11, is at 100 psia and that inlet stream, 111, is compressed to 500 psia in compressor, 19, and cooled to −40° C. in chiller, 20. Under these conditions, uncondensed stream, 16, still contains 33 mol % ethylene. The membrane unit was assumed to contain a membrane selective for the $C_{2+}$ hydrocarbons over methane and nitrogen, and having the following permeability properties, which are typical of a silicone rubber membrane, for example:

| Gas: | Pressure normalized flux ($\times 10^{-6}$ cm$^3$(STP)/cm$^2 \cdot$ s $\cdot$ cmHg) |
|---|---|
| Hydrogen | 200 |
| Methane | 240 |
| Ethane | 600 |
| Ethylene | 720 |
| Propane | 960 |
| Propylene | 1,200 |
| Butane | 1,920 |

After treatment in the membrane unit, the residue stream, 117, contains 98.8 mol % methane and hydrogen and 1 mol % ethylene. Condensate stream, 13, was assumed to be subjected to flash evaporation by reducing the pressure to 20 psia. The liquid product stream, 14, contains less than 0.01 mol % hydrogen and 1.8 mol % methane.

The results of the calculation are shown in full in Table 2. Stream numbers correspond to FIG. 2.

−100° C. as in a conventional plant. Also, both recirculation streams 115 and 118 are cold, so the refrigeration requirement is substantially less than in a conventional plant.

The membrane residue stream, 117, remains under pressure and could be subjected to additional membrane treatment, such as using Permea® membranes or the like, to separate the hydrogen from the methane.

Example 2

In Example 1, the condensation step was performed at −40° C. It might be assumed that carrying out this step at a lower temperature, such as −60° C., would be beneficial, since more ethylene is condensed immediately, thereby reducing the volume of the membrane permeate recycle stream, which lessens the load on the compressor. Therefore, we performed the same modeling calculation as in Example 1, but this time assuming the chiller cools the inlet stream to −60° C. The results are shown in Table 3.

As can be seen, the purity of the liquid hydrocarbon stream is lower than in the previous example. Stream 14

TABLE 2

| Stream | 11 | 111 | 16 | 117 | 118 | 13 | 14 | 115 |
|---|---|---|---|---|---|---|---|---|
| Volume (scfm) | 1,000 | 5,800 | 4,837 | 444 | 4,394 | 963 | 553 | 410 |
| Temp. (°C.) | 25 | −53 | −40 | −70 | −70 | −40 | −99 | −99 |
| Pressure (psia) | 100 | 20 | 500 | 500 | 20 | 500 | 20 | 20 |
| Component (mol %): | | | | | | | | |
| Hydrogen | 20 | 19.8 | 23.5 | 45 | 21.3 | 1.2 | — | 2.8 |
| Methane | 25 | 35.5 | 39.4 | 53.8 | 38.0 | 15.7 | 1.8 | 34.5 |
| Ethane | 5 | 3.1 | 2.4 | 0.2 | 2.6 | 6.6 | 8.9 | 3.5 |
| Propane | 1 | 0.25 | 0.1 | — | 0.1 | 1.1 | 1.8 | 0.04 |
| Butane | 6 | 1.2 | 0.2 | — | 0.2 | 6.3 | 10.8 | 0.04 |
| Ethylene | 35 | 38.1 | 33.6 | 1.0 | 36.9 | 60.7 | 62.2 | 58.6 |
| Propylene | 8 | 2.1 | 0.8 | — | 0.95 | 8.5 | 14.5 | 0.5 |

— less than 0.01%

The load on the cracker gas compressor is increased compared with the conventional process that uses condensation alone by the ratio 5,800:1,000, because of the recirculation of streams 115 and 118. The theoretical horsepower requirement of this compressor is 1,380 hp. However, the condensation step is performed at −40° C., rather than below contains 3.7 mol % methane, compared with only 1.8 mol % in Example 1. This is because the lower condensation temperature promotes dissolution of more methane in the condensing hydrocarbons during the condensation step. In this case, however, the compressor horsepower requirement is 800 hp, compared with 1,380 hp in Example 1.

TABLE 3

| Stream | 11 | 111 | 16 | 117 | 118 | 13 | 14 | 115 |
|---|---|---|---|---|---|---|---|---|
| Volume (scfm) | 1,000 | 3,247 | 2,338 | 435 | 1,904 | 909 | 566 | 342 |
| Temp. (°C.) | 25 | −47 | −60 | −81 | −70 | −60 | −107 | −107 |
| Pressure (psia) | 100 | 20 | 500 | 500 | 20 | 500 | 20 | 20 |
| Component (mol %): | | | | | | | | |
| Hydrogen | 20 | 23.9 | 32.7 | 46 | 29.7 | 1.3 | — | 3.5 |
| Methane | 25 | 41.8 | 48.7 | 52.8 | 47.7 | 24.1 | 3.7 | 57.7 |
| Ethane | 5 | 2.6 | 1.2 | 0.1 | 1.4 | 6.2 | 8.7 | 2.1 |
| Propane | 1 | 0.34 | 0.03 | — | 0.05 | 1.1 | 1.8 | 0.02 |
| Butane | 6 | 1.9 | 0.06 | — | 0.08 | 6.6 | 10.6 | 0.02 |
| Ethylene | 35 | 26.7 | 16.9 | 1.0 | 20.5 | 51.8 | 61.1 | 36.4 |
| Propylene | 8 | 2.8 | 0.4 | — | 0.47 | 8.9 | 14.1 | 0.2 |

— less than 0.01%

Example 3

In Example 1, it was assumed that the flash evaporation step is carried out by lowering the pressure on the condensate stream to 20 psia. This produces a flashed vapor stream of about 410 scfm containing the bulk of the methane and essentially all of the hydrogen contained in the liquid condensate. This flash operation cools the liquid product and flash gas streams to −99.3° C. At these temperature and pressure conditions, about 1.8 mol % methane remains in the liquid product.

We ran a series of calculations to determine what effect raising the temperature of the flashing step slightly would have on the methane removal. This was done by assuming that liquid product stream, 14, is heated by a few degrees. Some additional methane is then driven off, but of course this further increases the compressor load, and the membrane area required. The results of the calculations are given in Table 4.

TABLE 4

| Temperature of stream 14 (°C.) | Volume of flashed gas (scfm) | Membrane area required (m²) | Theoretical hp of compressor (hp) | Methane in product stream 14 (mol %) |
|---|---|---|---|---|
| −99.3 | 410 | 269 | 1,380 | 1.8 |
| −98 | 550 | 283 | 1,470 | 1.5 |
| −97 | 710 | 292 | 1,540 | 1.3 |
| −96 | 1,050 | 308 | 1,670 | 1.1 |
| −95 | 2,050 | 333 | 1,970 | 0.9 |

In all cases, the residue stream from the membrane separation step has a composition as in Example 1, that is, it contains only 1 mol % ethylene. As can be seen, very high purity liquid product can be obtained, the limiting factor being the amounts of membrane area and compressor capacity that are acceptable to use to deal with the much greater volume of flash gas that must be recirculated.

Example 4

Figure 4:
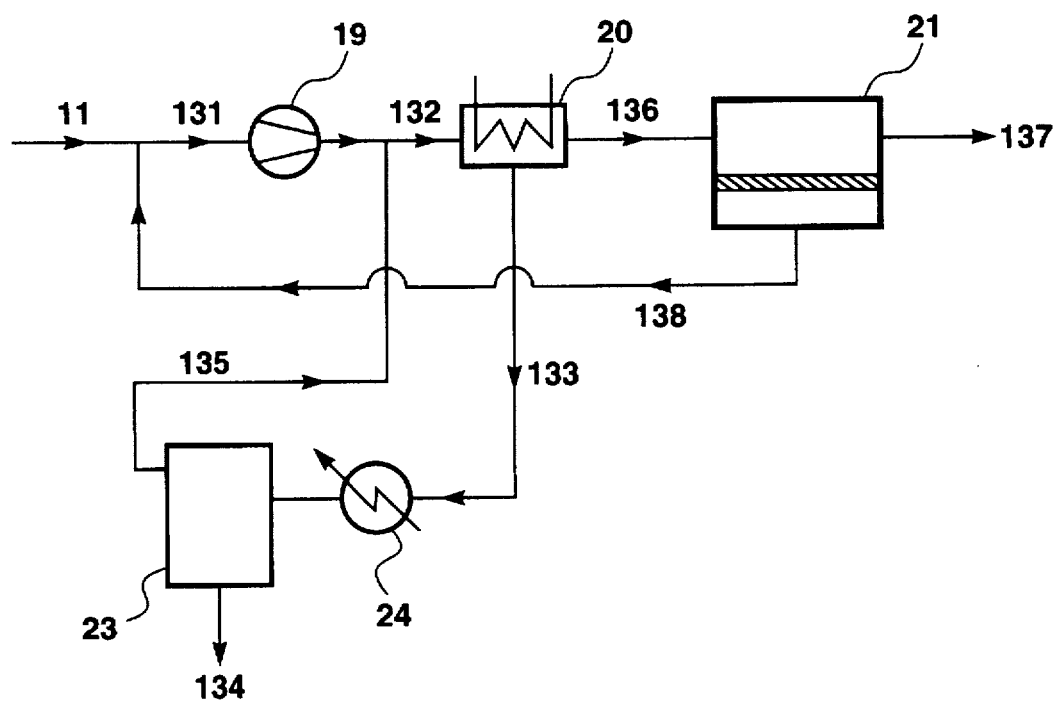
FIG. 4 is a schematic drawing of an embodiment of the invention in which flash evaporation is achieved by warming the stream to be flashed.

A computer calculation was performed using ChemCad software to model the separation of a feed stream having the same composition as in Example 1. In this case, the process was assumed to be as in FIG. 4. This process differs from the processes used in Examples 1 to 3, in that the flashing step is assumed to be carried out by heating alone, that is, without changing the pressure of the condensate stream. Referring now to FIG. 4, in which like elements have the same numbers as in previous figures, raw stream, 11, is again assumed to be at 100 psia. Inlet stream, 131, is compressed to 500 psia in compressor, 19. After mixing with return stream, 135, from the flash evaporation step to form stream, 132, the incoming gas is cooled to −40° C. in chiller, 20. Under these conditions, uncondensed stream, 136, still contains 31 mol % ethylene, and is passed to membrane unit, 21, which was assumed to contain a membrane with the same properties as in Example 1.

After treatment in the membrane unit, the residue stream, 137, contains 98.8 mol % methane and hydrogen and 1 mol % ethylene. Condensate stream, 133, is subjected to flash evaporation by heating to −10° C. in heater, 24. The liquid product stream, 134, is withdrawn from the flash tank, 23. Flashed gas stream, 135, is recirculated to the condensation step. Since the gas remains under pressure, it need not be recompressed, but can join the feed line downstream of the compressor but upstream of the chiller, as shown in the figure. Membrane permeate stream, 138, which is at low pressure, is recirculated as in the earlier calculations upstream of the inlet compressor.

The results of the calculation are shown in full in Table 5. Stream numbers correspond to FIG. 4. As can be seen, this type of separation is less efficient than low-pressure flashing; the product liquid, stream 134, still contains 9.7 mol % methane. However, the compressor horsepower requirement, 1,100 hp, and membrane area, 215 m², are both modest.

TABLE 5

| Stream | 11 | 131 | 132 | 138 | 135 | 133 | 136 | 137 | 134 |
|---|---|---|---|---|---|---|---|---|---|
| Volume (scfm) | 1,000 | 4,426 | 4,617 | 3,428 | 191 | 796 | 3,820 | 393 | 605 |
| Temp. (°C.) | 25 | −43 | 33 | −66 | −10 | −40 | −40 | −66 | −10 |
| Pressure (psia) | 100 | 20 | 500 | 20 | 500 | 500 | 500 | 500 | 500 |
| Component (mol %): | | | | | | | | | |
| Hydrogen | 20 | 24.1 | 23.3 | 25.3 | 4.5 | 1.3 | 27.9 | 50.4 | 0.3 |
| Methane | 25 | 33.5 | 33.3 | 35.9 | 29.4 | 14.5 | 37.2 | 48.4 | 9.7 |
| Ethane | 5 | 3.4 | 3.5 | 2.9 | 5.6 | 7.5 | 2.6 | 0.2 | 8.1 |
| Propane | 1 | 0.32 | 0.32 | 0.1 | 0.4 | 1.3 | 0.1 | — | 1.7 |
| Butane | 6 | 1.5 | 1.5 | 0.2 | 1.0 | 7.8 | 0.2 | — | 9.9 |
| Ethylene | 35 | 34.5 | 35.4 | 34.3 | 55.5 | 56.7 | 30.9 | 1.0 | 57.0 |
| Propylene | 8 | 2.7 | 2.7 | 1.2 | 3.6 | 10.9 | 1.0 | — | 13.2 |

— less than 0.01%

The calculations were repeated using flash temperatures of −5° C. and −20° C. At −5° C., the methane content of the product liquid is about 8 mol %; at −20° C. it is about 12 mol %. This would suggest that better results could be obtained at a higher flash temperature. However, above about 0° C. it is not possible to retain the purity of the membrane residue stream while keeping other conditions constant. At this point, the ethylene content of the stream rises above 1 mol %.

Example 5

During production of polyvinyl chloride (PVC), it is necessary to purge the polymerization reactor to remove air or other gases that would otherwise build up in the reactor. The purge gas from the reactor typically contains about equal amounts of vinyl chloride monomer and air. Conventionally, the purge gas may be subjected to condensation to recapture the vinyl chloride monomer.

An improved process for capturing and recovering the monomer is provided by the processes of the invention.

A computer calculation was performed using ChemCad software to model the vinyl chloride/air separation. It was assumed that the process configuration used was as in FIG. 2, that raw stream, 11, is at 15 psia and that inlet stream, 111, is compressed to 75 psia in compressor, 19, and cooled to 4° C. in chiller, 20. Under these conditions, uncondensed stream, 16, still contains almost 40 mol % vinyl chloride. The membrane unit was assumed to contain a membrane selective for vinyl chloride over the components of air, and having the following permeability properties, which are typical of a silicone rubber membrane, for example:

| Gas: | Pressure normalized flux ($\times 10^{-6}$ cm$^3$(STP)/cm$^2 \cdot$ s $\cdot$ cmHg) |
| --- | --- |
| Vinyl chloride | 1,440 |
| Carbon dioxide | 800 |
| Oxygen | 170 |
| Nitrogen | 80 |

After treatment in the membrane unit, the residue stream, 117, contains 5 mol % vinyl chloride. Condensate stream, 13, was assumed to be subjected to flash evaporation by reducing the pressure to 15 psia. The liquid vinyl chloride product stream, 14, is essentially pure.

The results of the calculation are shown in Table 6. Stream numbers correspond to FIG. 2.

TABLE 6

| Stream | 11 | 111 | 16 | 13 | 115 | 14 | 117 | 118 |
| --- | --- | --- | --- | --- | --- | --- | --- | --- |
| Volume (m$^3$/h) | 199 | 390 | 296 | 94 | 2.0 | 92 | 106 | 190 |
| Component (mol %): | | | | | | | | |
| Vinyl chloride | 49.4 | 54.1 | 39.9 | 99.1 | 49.8 | 100 | 5.4 | 59.4 |
| Carbon dioxide | 0.4 | 2.3 | 2.9 | 0.4 | 22.0 | — | 7.5 | 4.1 |
| Oxygen | 7.1 | 8.7 | 11.4 | 0.1 | 6.1 | — | 13.3 | 10.3 |
| Nitrogen | 43.1 | 0.4 | 45.8 | 0.4 | 22.1 | — | 80.1 | 26.3 |

— less than 0.01%

Example 6

A ChemCad calculation was performed to model the treatment of a vent stream from a purge bin in a polypropylene manufacturing plant. The stream was assumed to contain about equal amounts of propylene and nitrogen, plus a few percent of propane and water vapor. The process configuration was assumed to be as in FIG. 2, except that it was assumed that a dryer is used between the compressor and the chiller to remove water vapor.

It was assumed that raw stream, 11, is at 25 psia and that inlet stream, 111, is compressed to 165 psia in compressor, 19, and cooled to −30° C. in chiller, 20. Under these conditions, uncondensed stream, 16, still contains about 21 mol % propylene. The membrane unit was assumed to contain a membrane selective for the $C_3$ hydrocarbons over nitrogen and to have the following permeability properties, which are typical of a silicone rubber membrane, for example:

| Gas: | Pressure normalized flux ($\times 10^{-6}$ cm$^3$(STP)/cm$^2 \cdot$ s $\cdot$ cmHg) |
| --- | --- |
| Propylene | 1,200 |
| Propane | 1,200 |
| Nitrogen | 80 |
| Water vapor | 2,500 |

After treatment in the membrane unit, the residue stream, 117, contains 99.9 mol % nitrogen. Condensate stream, 13, was assumed to be subjected to flash evaporation by reducing the pressure to 25 psia. The liquid product stream, 14, contains essentially no nitrogen.

The results of the calculation are shown in full in Table 7. Stream numbers correspond to FIG. 2, except that 112' indicates the stream composition after compression and drying.

TABLE 7

| Stream | 11 | 111 | 112' | 16 | 117 | 118 | 13 | 115 | 14 |
| --- | --- | --- | --- | --- | --- | --- | --- | --- | --- |
| Volume (scfm) | 375 | 905 | 894 | 690 | 175 | 515 | 204 | 15 | 189 |
| Temp. (°C.) | 25 | −0.5 | 35 | −30 | −37 | −37 | −30 | −41 | −41 |
| Pressure (psia) | 25 | 25 | 165 | 165 | 155 | 25 | 165 | 25 | 25 |
| Component (mol %): | | | | | | | | | |
| Propylene | 48.5 | 37.1 | 37.4 | 20.7 | 0.07 | 27.7 | 94.7 | 75.7 | 96.3 |
| Propane | 1.8 | 1.3 | 1.3 | 0.7 | — | 0.9 | 3.6 | 2.5 | 3.7 |
| Nitrogen | 46.5 | 60.2 | 60.7 | 78.6 | 99.9 | 71.4 | 1.7 | 21.9 | — |
| Water vapor | 3.1 | 1.3 | — | — | — | — | — | — | — |

— less than 0.01%

Example 7

As in Example 6, a ChemCad calculation was performed to model the treatment of a vent stream from a purge bin in a polypropylene manufacturing plant. In this case, the stream was assumed to come from a different type of polymerization process, and to contain some hexane and hydrogen, in addition to propylene, propane and nitrogen. The total $C_3$ content was assumed to be much lower than in Example 6, at about 12 mol %. The process configuration was again assumed to be as in FIG. 2.

It was assumed that raw stream, 11, is at 16 psia and 65° C., and that inlet stream, 111, is compressed to 200 psia in compressor, 19, and cooled to −30° C. in chiller, 20. Under these conditions, uncondensed stream, 16, still contains about 17 mol % propylene. The membrane unit was assumed to contain a membrane selective for the hydrocarbons over nitrogen and to have the following permeability properties, which are typical of a silicone rubber membrane, for example:

| Gas: | Pressure normalized flux ($\times 10^{-6}$ cm$^3$(STP)/cm$^2 \cdot$ s $\cdot$ cmHg) |
|---|---|
| Propylene | 1,200 |
| Propane | 1,200 |
| Hexane | 2,400 |
| Nitrogen | 80 |
| Hydrogen | 200 |

After treatment in the membrane unit, the residue stream, 117, contains about 2 mol % propylene. Condensate stream, 13, was assumed to be subjected to flash evaporation by reducing the pressure to 20 psia. The liquid product stream, 14, contains 99.9 mol % hydrocarbons.

The results of the calculation are shown in full in Table 8. Stream numbers correspond to FIG. 2.

TABLE 8

| Stream | 11 | 111 | 16 | 13 | 115 | 14 | 118 | 117 |
|---|---|---|---|---|---|---|---|---|
| Volume (scfm) | 542 | 900 | 834 | 66 | 6.5 | 59 | 351 | 483 |
| Temp. (°C.) | 65 | 37 | −30 | −30 | −45 | −45 | −36 | −35 |
| Pressure (psia) | 16 | 16 | 200 | 200 | 205 | 20 | 155 | 190 |
| Component (mol %): | | | | | | | | |
| Hydrogen | 0.7 | 0.7 | 0.8 | — | 0.1 | — | 0.9 | 0.8 |
| Propylene | 11.8 | 22.1 | 16.8 | 90.0 | 75.4 | 91.6 | 37.2 | 2.0 |
| Propane | 0.7 | 1.2 | 0.9 | 5.4 | 3.9 | 5.6 | 1.9 | 0.1 |
| Hexane | 0.35 | 1.8 | — | 2.5 | — | 2.7 | — | — |
| Nitrogen | 86.5 | 75.7 | 81.5 | 2.1 | 20.6 | 0.1 | 60.0 | 97.1 |

— less than 0.01%

Example 8

Figure 5:
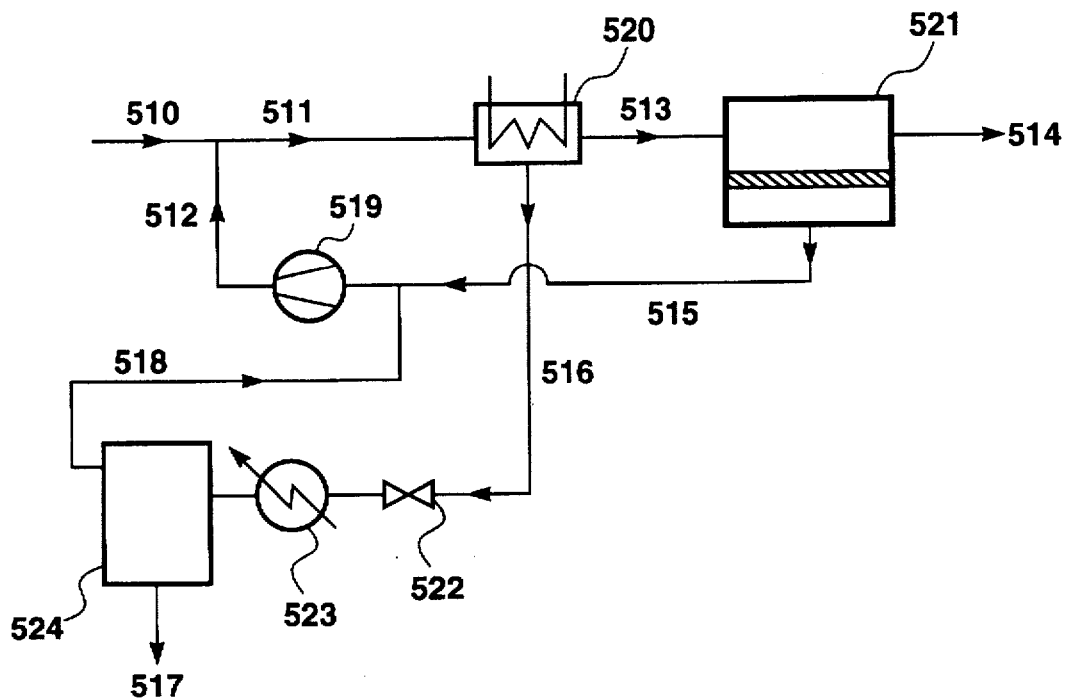
FIG. 5 is a schematic drawing of an embodiment of the invention in which the feed gas is already at high pressure, and in which flash evaporation is achieved by a combination of pressure reduction and warming.

A ChemCad calculation was performed to model the treatment of a natural gas stream, to remove $C_{3+}$ hydrocarbons, with small loss of methane into the natural gas liquid (NGL) stream. The raw gas stream was assumed to be at a pressure of 1,000 psia, obviating the need for additional compression in the condensation step. The process configuration was, therefore, assumed to be as in FIG. 5. This process differs from the processes used in the examples reported so far in that no compressor is used in the incoming feed line, and the flash evaporation is achieved by a combination of pressure release and heating. Referring now to FIG. 5, raw stream, 510, is at 1,000 psia pressure. Inlet stream, 511, to chiller or condenser, 520, is made up of raw stream, 510, and recirculation stream, 512. The condenser was assumed to chill the gas to 5° C. Under these conditions, uncondensed stream, 513, still contains over 10 mol % $C_{3+}$ hydrocarbons, and is passed to membrane unit, 521, which was assumed to contain a membrane with the same properties as in Example 1.

After treatment in the membrane unit, the residue stream, 514, contains about 6 mol % propane, 1 mol % n-butane and 0.1 mol % n-pentane. Such a stream meets typical pipeline specifications. Membrane permeate stream, 515, is assumed to be at 250 psia pressure, and is passed to compressor, 519, to raise the pressure to 1,000 psia again before mixing with the raw feed stream upstream of the condenser. Condensate stream, 516, is subjected to flash evaporation by passing through expansion valve, 522, and heater, 523. This lowers the pressure of the stream to 250 psia and warms it to 25° C. The gas that is flashed off under these conditions is recirculated as stream, 518, for recompression in compressor, 519. The liquid NGL product stream, 517, is withdrawn from the flash tank, 524. This stream contains about 89 mol % $C_{3+}$ components, the remainder being about 6 mol % methane and 5 mol % ethane.

The results of the calculation are shown in full in Table 9. Stream numbers correspond to FIG. 5.

TABLE 9

| Stream | 510 | 511 | 516 | 513 | 515 | 518 | 512 | 514 | 517 |
|---|---|---|---|---|---|---|---|---|---|
| Volume (scfm) | 10,000 | 13,186 | 907 | 12,279 | 2,558 | 626 | 3,184 | 9,721 | 281 |
| Temp. (°C.) | 15 | 31 | 5 | 5 | −1.2 | 255 | 74 | −1.2 | 25 |
| Pressure (psia) | 1,000 | 1,000 | 1,000 | 1,000 | 250 | 250 | 1,000 | 1,000 | 250 |
| Component (mol %): | | | | | | | | | |
| Methane | 85.5 | 80.5 | 40.1 | 83.5 | 67.4 | 55.3 | 65.0 | 87.8 | 6.1 |
| Ethane | 5.0 | 6.1 | 9.1 | 5.9 | 9.24 | 10.7 | 9.5 | 5.0 | 5.4 |
| Propane | 7.0 | 10.1 | 31.1 | 8.5 | 18.4 | 26.3 | 20.0 | 6.0 | 41.8 |
| n-Butane | 2.0 | 2.7 | 15.1 | 1.8 | 44.1 | 6.8 | 4.9 | 1.1 | 33.6 |
| n-Pentane | 0.5 | 0.5 | 4.6 | 0.2 | 0.6 | 0.9 | 0.7 | 0.1 | 13.0 |

— less than 0.01%

Example 9

During sulfuric acid manufacture, streams containing sulfur dioxide and nitrogen are produced. It is often desirable to convert such a stream to liquid sulfur dioxide with essentially no nitrogen content.

A computer calculation was performed using ChemCad software to model the sulfur dioxide/nitrogen separation that can be achieved using the processes of the invention. It was assumed that the process configuration used was as in FIG. 2, that raw stream, 11, is at 25 psia and contains 90 mol % sulfur dioxide, 10 mol % nitrogen, and that inlet stream, 111, is compressed to 100 psia in compressor, 19, and cooled to −20° C. in chiller, 20. Under these conditions, uncondensed stream, 16, still contains about 10 mol % sulfur dioxide. The membrane unit was assumed to contain a membrane selective for sulfur dioxide over nitrogen, with a sulfur dioxide pressure normalized flux of about $1,600 \times 10^{-6}$ cm$^3$(STP)/cm$^2$·s·cmHg, and a nitrogen pressure normalized flux of about $80 \times 10^{-6}$ cm$^3$(STP)/cm$^2$·s·cmHg.

After treatment in the membrane unit, the residue stream, 117, contains 99.9 mol % nitrogen. Condensate stream, 13, was assumed to be subjected to flash evaporation by reducing the pressure to 25 psia. The liquid sulfur dioxide product stream, 14, is essentially pure, containing only 0.04 mol % nitrogen.

The results of the calculation are shown in Table 10. Stream numbers correspond to FIG. 2.

| Gas: | Pressure normalized flux ($\times 10^{-6}$ cm$^3$(STP)/cm$^2$ · s · cmHg) |
|---|---|
| Vinyl chloride | 1 |
| Carbon dioxide | 120 |
| Oxygen | 30 |
| Nitrogen | 10 |

Figure 6:
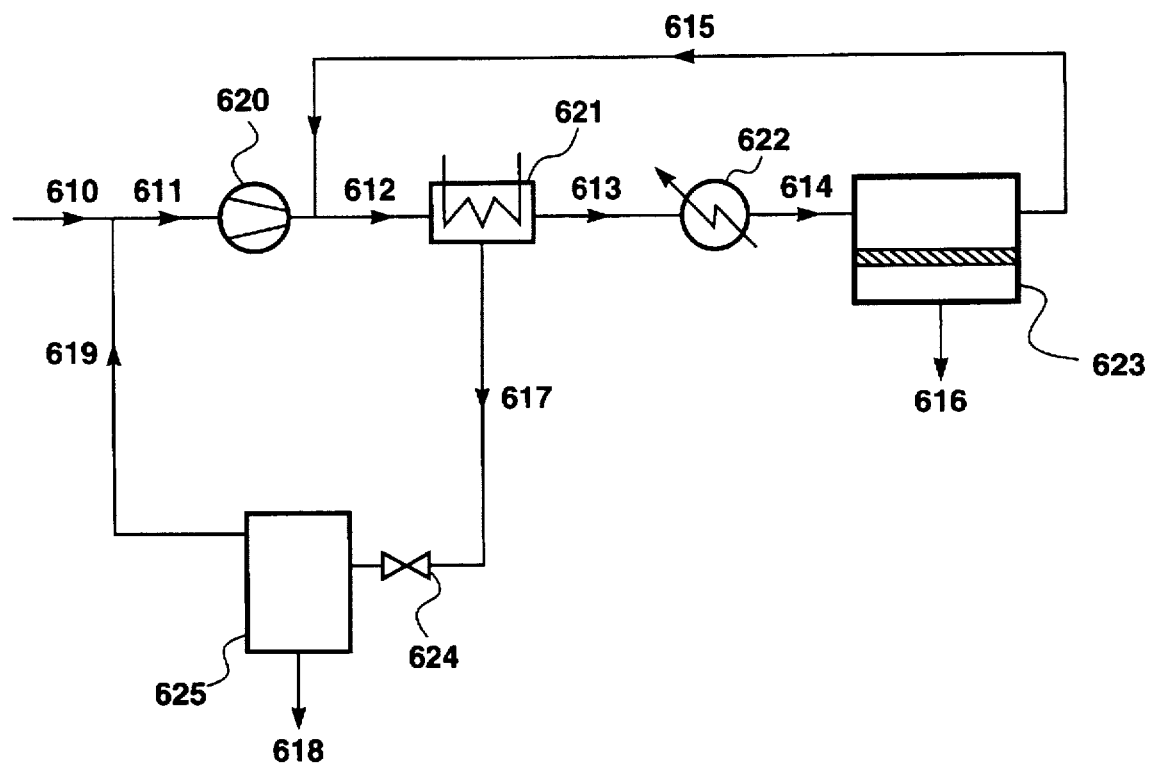
FIG. 6 is a schematic drawing of an embodiment of the invention in which a membrane selective for the lower boiling point component is used.

The process configuration was assumed to be as in FIG. 6. Referring now to that figure, raw stream, 610, is at 25 psia and 25° C. and contains about equal amounts of vinyl chloride and air. Inlet stream, 611, is compressed to 250 psia in compressor, 620, and compressed stream 612, which includes recirculated stream, 615, is cooled to 5° C. in chiller or condenser, 621. Under these conditions, uncondensed stream, 613, still contains about 14 mol % vinyl chloride. Since this stream is saturated with vinyl chloride, and will be further enriched in vinyl chloride content on the high-pressure side of the membrane unit, 623, the stream must be heated to avoid condensation of vinyl chloride with the membrane modules. To this end, heater, 622, is positioned between the condenser and the membrane unit. Heated stream, 614, passes to the membrane unit, where it is treated to yield vinyl-chloride-enriched residue stream, 615, which is recirculated upstream of the condenser. Permeate stream, 616, contains about 4 mol % vinyl chloride. Condensate stream, 617, was assumed to be subjected to flash evaporation by reducing the pressure to 25 psia by means of

TABLE 10

| Stream | 11 | 111 | 16 | 13 | 115 | 14 | 117 | 118 |
|---|---|---|---|---|---|---|---|---|
| Volume (scfm) | 1,000 | 1,544 | 641 | 903 | 2.7 | 900 | 100 | 540 |
| Component (mol %): | | | | | | | | |
| Sulfur dioxide | 90 | 62.4 | 9.7 | 99.8 | 36.7 | 99.96 | 0.1 | 11.5 |
| Nitrogen | 10 | 37.6 | 90.3 | 0.2 | 63.3 | 0.04 | 99.9 | 88.5 |

— less than 0.01%

Example 10

A computer calculation was performed using ChemCad software to model the same separation as in Example 5, that is, removal of air from vinyl chloride monomer. This time, however, it was assumed that an air-selective, vinyl chloride rejecting membrane was used in the membrane unit. Such a membrane might be a glassy membrane, such as a polysulfone or a polyimide membrane. Typical representative permeability properties were assumed as follows:

expansion valve, 624. The resulting flashed gas stream, 619, is recirculated upstream of compressor, 620. The liquid vinyl chloride product stream, 618, is withdrawn from the flash tank, 625. This stream contains about 99.6 mol % vinyl chloride.

The results of the calculation are shown in Table 11. Stream numbers correspond to FIG. 6.

TABLE 11

| Stream | 610 | 611 | 612 | 614 | 615 | 617 | 619 | 618 | 616 |
|---|---|---|---|---|---|---|---|---|---|
| Volume (scfm) | 118 | 121 | 136 | 77.0 | 14.9 | 59.1 | 3.4 | 55.7 | 62.0 |
| Component (mol %): | | | | | | | | | |
| Vinyl chloride | 49.4 | 49.8 | 50.9 | 15.0 | 60.0 | 97.6 | 63.9 | 99.6 | 4.3 |
| Carbon dioxide | 0.4 | 0.4 | 0.4 | 0.4 | — | 0.3 | 1.5 | 0.2 | 0.6 |
| Oxygen | 7.1 | 7.1 | 6.4 | 10.9 | 0.3 | 0.5 | 7.5 | — | 13.4 |
| Nitrogen | 43.1 | 42.7 | 42.3 | 73.6 | 39.7 | 1.7 | 27.1 | 0.1 | 81.7 |

— less than 0.01%

Comparative Example 11

Computer calculations were performed using ChemCad III software (Chemstations Inc., Houston, Tex.) to model the separation of components of steam-cracking off-gases. The feed stream composition was assumed to be the same as in Example 1, that is about 45 mol % hydrogen and methane, 35 mol % ethylene, the balance other low molecular weight hydrocarbons. In these calculations, which are not in accordance with the invention, it was assumed that the separation of hydrogen and methane from the hydrocarbons was to be done by high pressure/low temperature condensation alone. The condensation pressure for all calculations was assumed to be 500 psia; the condensation temperature was varied from −120° C. to 20° C. The compositions of the condensed and uncondensed fractions in each case were compared with the results obtained from Example 1. The results are shown in Table 12.

Raw stream, 910, was assumed to have the composition shown in Table 13, plus traces of other non-condensable gases not shown in the table, to be at 30 psia and 35° C., and to be compressed to 200 psia. Other assumptions were as in Example 6. The results of the calculations are summarized in Table 13.

TABLE 13

| Stream | 910 | 912 | 913 | 914 | 915 | 916 | 918 | 917 |
|---|---|---|---|---|---|---|---|---|
| Flow (lb/h) | 5,000 | 8,730 | 6,842 | 3,265 | 3,577 | 1,890 | 156 | 1,734 |
| Temp. (°C.) | 35 | 35 | −34 | −40 | −40 | −34 | −48 | −48 |
| Pressure (psia) | 30 | 200 | 200 | 184 | 32 | 200 | 25 | 25 |
| Component (mol %): | | | | | | | | |
| Propylene | 25.0 | 25.9 | 13.8 | 1.9 | 26.1 | 85.7 | 53.1 | 89.1 |
| Propane | 2.0 | 1.9 | 1.0 | 0.13 | 1.8 | 6.9 | 3.6 | 7.2 |
| Ethylene | 2.0 | 6.1 | 6.3 | 1.4 | 11.3 | 5.2 | 21.1 | 3.6 |
| Nitrogen | 70.0 | 64.5 | 77.1 | 95.1 | 58.6 | 2.0 | 21.0 | — |

— less than 0.01%

TABLE 12

| Condensation temperature (°C.) | Condensate methane content (mol %) | Uncondensed stream $C_{2+}$ content (mol %) |
|---|---|---|
| −120 | 28 | 0.8 |
| −110 | 26 | 1.5 |
| −100 | 25 | 2.7 |
| −60 | 17 | 16 |
| −40 | 13 | 29 |
| −20 | 9.5 | 41 |
| 1 | 7.2 | 50 |
| 20 | No condensation | |
| Example 1 process | 1.8 | 1 |

As can be seen, condensation alone at these pressure and temperature conditions could not produce a condensate and a hydrogen/methane stream of reasonable purity.

Example 12

A computer calculation similar to that of Examples 6 and 7 was performed using ChemCad III software (Chemstations Inc., Houston, Tex.) to model the treatment of a vent stream from a purge bin in a polypropylene manufacturing plant. In this case, however, the process configuration was assumed to be as in FIG. 9, that is, with no external cooling capacity provided. It was further assumed that the gas phase from the flash separator was returned and added to the membrane permeate stream before it passed into the heat exchanger. For the purposes of the calculations, it was assumed that the membrane residue and permeate streams are at the same temperature. Since there is good heat transfer within the membrane modules, this is a reasonable approximation.

As can be seen, the process can produce an essentially pure monomer stream suitable for reuse, and a purge gas stream from the membrane containing 95 mol % nitrogen. This is accomplished without any external cooling. In this configuration, however, the purified monomer stream, 917, vaporizes in the heat exchanger, and so the product leaves the process as a gas rather than a liquid.

We claim:

1. A process for separating a higher-boiling and a lower-boiling component of a gaseous mixture, both components having boiling points at atmospheric pressure below 0° C., said process comprising the following steps:

(a) cooling said gaseous mixture to a temperature no lower than about −100° C., resulting in partial condensation of said gaseous mixture, thereby dividing said gaseous mixture into a condensed portion enriched in said higher-boiling component and an uncondensed portion enriched in said lower-boiling component;

(b) flash evaporating said condensed portion to at least partially remove additional amounts of said lower-boiling component from said condensed portion as a gaseous flash stream, thereby creating a more-enriched higher-boiling component product stream;

(c) membrane treating said uncondensed portion in a membrane separation unit, to further divide said uncondensed portion into a more-enriched lower-boiling component stream and a mixed stream;

(d) recirculating said mixed stream to said cooling step.

2. The process of claim 1, further comprising a compressing step to compress said gaseous mixture prior to said cooling step (a).

3. The process of claim 2, wherein said compressing step is carried out at a pressure no greater than about 1,000 psig.

4. The process of claim 2, wherein said mixed stream and said gaseous flash stream are recirculated to said compressing step.

5. The process of claim 1, wherein said cooling step (a) is carried out at a temperature no lower than about −40° C.

6. The process of claim 1, wherein said cooling step (a) is carried out at a temperature no lower than about 0° C.

7. The process of claim 1, wherein said cooling step (a) is carried out in multiple cooling stages to produce at least two separate condensates, of which at least one of said separate condensates is used as said condensed portion.

8. The process of claim 1, wherein said flash evaporating step (b) is carried out by reducing the pressure of said condensed portion.

9. The process of claim 1, wherein said flash evaporating step (b) is carried out by increasing the temperature of said condensed portion.

10. The process of claim 1, wherein said flash evaporating step (b) is carried out in multiple flashing stages to produce at least two separate gaseous flash streams, of which at least one is subjected to said recirculating step (d).

11. The process of claim 1, wherein said membrane treating step (c) is carried out using a membrane selective for said higher-boiling component.

12. The process of claim 1, wherein said membrane treating step (c) is carried out using a membrane selective for said lower-boiling component.

13. The process of claim 1, wherein said membrane treating step (c) is carried out using a membrane having a selectivity for one of said components over the other of at least about 10.

14. The process of claim 1, wherein said gaseous flash stream is recirculated to said cooling step (a).

15. The process of claim 1, wherein said higher-boiling component has a boiling point higher than about −100° C.

16. The process of claim 1, wherein said lower-boiling component has a boiling point lower than about −100° C.

17. The process of claim 1, wherein said higher-boiling component is an organic compound.

18. The process of claim 1, wherein said higher-boiling component is a light hydrocarbon.

19. The process of claim 1, wherein said higher-boiling component is a halogenated hydrocarbon.

20. The process of claim 1, wherein said higher-boiling component is an olefin.

21. The process of claim 1, wherein said lower-boiling component is air.

22. The process of claim 1, wherein said lower-boiling component is nitrogen.

23. The process of claim 1, wherein said lower-boiling component is methane.

24. The process of claim 1, wherein said lower-boiling component is hydrogen.

25. The process of claim 1, wherein said cooling is achieved at least in part by heat exchange against said more-enriched higher-boiling component product stream.

26. The process of claim 1, wherein said cooling is achieved at least in part by heat exchange against said more-enriched lower-boiling component stream.

27. The process of claim 1, wherein said cooling is achieved at least in part by heat exchange against said mixed stream.

28. A process for separating a higher-boiling and a lower-boiling component of a gaseous mixture, both components having boiling points at atmospheric pressure below 0° C., said process comprising the following steps:

(a) cooling said gaseous mixture to a temperature no lower than about −100° C., resulting in partial condensation of said gaseous mixture, thereby dividing said gaseous mixture into a condensed portion enriched in said higher-boiling component and an uncondensed portion enriched in said lower-boiling component;

(b) flash evaporating said condensed portion to at least partially remove additional amounts of said lower-boiling component from said condensed portion as a gaseous flash stream, thereby creating a more-enriched higher-boiling component product stream;

(c) membrane treating said uncondensed portion in a membrane separation unit, to further divide said uncondensed portion into a more-enriched lower-boiling component stream and a mixed stream;

(d) recirculating said gaseous flash stream to said cooling step.

29. The process of claim 28, further comprising a compressing step to compress said gaseous mixture prior to said cooling step (a).

30. The process of claim 29, wherein said compressing step is carried out at a pressure no greater than about 1,000 psig.

31. The process of claim 29, wherein said cooling is achieved at least in part by heat exchange against said more-enriched lower-boiling component stream.

32. The process of claim 29, wherein said cooling is achieved at least in part by heat exchange against said mixed stream.

33. The process of claim 28, wherein said cooling step (a) is carried out at a temperature no lower than about −40° C.

34. The process of claim 28, wherein said cooling step (a) is carried out at a temperature no lower than about 0° C.

35. The process of claim 28, wherein said cooling step (a) is carried out in multiple cooling stages to produce at least two separate condensates, of which at least one of said separate condensates is used as said condensed portion.

36. The process of claim 28, wherein said flash evaporating step (b) is carried out by reducing the pressure of said condensed portion.

37. The process of claim 28, wherein said flash evaporating step (b) is carried out by increasing the temperature of said condensed portion.

38. The process of claim 28, wherein said flash evaporating step (b) is carried out in multiple flashing stages to produce at least two separate gaseous flash streams and wherein at least one of said at least two separate gaseous flash streams is recirculated in step (d).

39. The process of claim 28, wherein said membrane treating step (c) is carried out using a membrane selective for said higher-boiling component.

40. The process of claim 28, wherein said membrane treating step (c) is carried out using a membrane selective for said lower-boiling component.

41. The process of claim 28, wherein said membrane treating step (c) is carried out using a membrane having a selectivity for one of said components over the other of at least about 10.

42. The process of claim 28, wherein said mixed stream is recirculated to said cooling step (a).

43. The process of claim 28, wherein said higher-boiling component has a boiling point higher than about −100° C.

44. The process of claim 28, wherein said lower-boiling component has a boiling point lower than about −100° C.

45. The process of claim 28, wherein said higher-boiling component is an organic compound.

46. The process of claim 28, wherein said higher-boiling component is a light hydrocarbon.

47. The process of claim 28, wherein said higher-boiling component is a halogenated hydrocarbon.

48. The process of claim 28, wherein said higher-boiling component is an olefin.

49. The process of claim 28, wherein said lower-boiling component is air.

50. The process of claim 28, wherein said lower-boiling component is nitrogen.

51. The process of claim 28, wherein said lower-boiling component is methane.

52. The process of claim 28, wherein said lower-boiling component is hydrogen.

53. The process of claim 28, wherein said cooling is achieved at least in part by heat exchange against said more-enriched higher-boiling component product stream.

54. A process for separating a higher-boiling and a lower-boiling component of a gaseous mixture, both components having boiling points at atmospheric pressure below 0° C., said process comprising the following steps:

(a) cooling said gaseous mixture, said cooling being provided at least in part by heat exchange against at least one colder stream, to a temperature no lower than about −100° C., resulting in partial condensation of said gaseous mixture, thereby dividing said gaseous mixture into a condensed portion enriched in said higher-boiling component and an uncondensed portion enriched in said lower-boiling component;

(b) flash evaporating said condensed portion to at least partially remove additional amounts of said lower-boiling component from said condensed portion as a gaseous flash stream, thereby creating a more-enriched higher-boiling component product stream;

(c) membrane treating said uncondensed portion in a membrane separation unit, to further divide said uncondensed portion into a more-enriched lower-boiling component stream and a mixed stream;

(d) recirculating said mixed stream upstream of said cooling step;

wherein said at least one colder stream is selected from the group consisting of said more-enriched lower-boiling component stream, said mixed stream and said more-enriched higher-boiling component product stream.

55. The process of claim 54, wherein said at least one colder stream comprises said more-enriched lower-boiling component stream and said mixed stream.

56. The process of claim 54, wherein said at least one colder stream comprises said more-enriched lower-boiling component stream, said mixed stream and said more-enriched higher-boiling component product stream.

57. The process of claim 54, further comprising a compressing step to compress said gaseous mixture prior to said cooling step (a).

* * * * *